US012585934B2

(12) United States Patent
Wagner et al.

(10) Patent No.: US 12,585,934 B2
(45) Date of Patent: Mar. 24, 2026

(54) COMPRESSING TOKENS BASED ON POSITIONS FOR TRANSFORMER MODELS

(71) Applicant: Microsoft Technology Licensing, LLC, Redmond, WA (US)

(72) Inventors: Andy Wagner, Cupertino, CA (US); Tiyasa Mitra, San Jose, CA (US); Marc Tremblay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 884 days.

(21) Appl. No.: 16/935,089

(22) Filed: Jul. 21, 2020

(65) Prior Publication Data

US 2022/0027719 A1 Jan. 27, 2022

(51) Int. Cl.
| | |
|---|---|
| *G06N 3/08* | (2023.01) |
| *G06F 16/242* | (2019.01) |
| *G06F 18/214* | (2023.01) |
| *G06F 40/284* | (2020.01) |

(52) U.S. Cl.
CPC ............. *G06N 3/08* (2013.01); *G06F 16/243* (2019.01); *G06F 18/214* (2023.01); *G06F 40/284* (2020.01)

(58) Field of Classification Search
CPC ...... G06F 16/243; G06F 18/214; G06F 40/20; G06F 40/284; G06N 3/045; G06N 3/08; G06N 3/084; G06N 3/049; G06N 3/00
See application file for complete search history.

(56) References Cited

U.S. PATENT DOCUMENTS

| | | | |
|---|---|---|---|
| 2014/0358923 A1* | 12/2014 | Nunez | G06F 16/353 707/737 |
| 2015/0325235 A1* | 11/2015 | Levit | G06F 40/216 704/257 |
| 2020/0342316 A1* | 10/2020 | Shazeer | G06N 3/045 |

FOREIGN PATENT DOCUMENTS

| | | |
|---|---|---|
| CN | 111386537 A | 7/2020 |

OTHER PUBLICATIONS

"Glossary", Retrieved From: https://web.archive.org/web/20200520052843/https://huggingface.co/transformers/glossary.html, May 20, 2020, pp. 1-4. (Year: 2020).*
"How to Combine Duplicates in to One Cell Per Column in R", Retrieved From : https://stackoverflow.com/questions/59774089/how-to-combine-duplicates-in-to-one-cell-per-column-in-r, Jan. 16, 2020, pp. 1-2. (Year: 2020).*

(Continued)

*Primary Examiner* — Brent Johnston Hoover
(74) *Attorney, Agent, or Firm* — Holzer Patel Drennan

(57) ABSTRACT

Embodiments of the present disclosure include systems and methods for compressing tokens based on positions for training data that is used to train transformer models. In some embodiments, a set of input data for training a transformer model is received. The set of input data comprises a set of tokens and a set of position values. A first token in the set of tokens that is the same as a second token in the set of tokens is identified. The position value representing the first token with the position value representing the second token are combined. The set of tokens is modified by removing the first token from the set of tokens. A set of training data is generated to comprise the modified set of tokens and the set of position values. The transformer model is trained using the set of training data.

20 Claims, 8 Drawing Sheets

800

810 Receiving a set of input data for training a transformer model, the set of input data comprising a set of tokens and a set of position values, wherein each position value in the set of position values represents a position of a token in the set of tokens relative to other tokens in the set of tokens 820 Identifying a first token in the set of tokens that is the same as a second token in the set of tokens 830 Combining the position value representing the first token with the position value representing the second token 840 Modify the set of tokens by removing the first token from the set of tokens 850 Generating a set of training data to comprise the modified set of tokens and the set of position values 860 Training the transformer model using the set of training data

(56)               References Cited

OTHER PUBLICATIONS

"Glossary", Retrieved From: https://web.archive.org/web/20200520052843/https://huggingface.co/transformers/glossary.html, May 20, 2020, 4 Pages.

"How to Combine Duplicates in to One Cell Per Column in R", Retrieved From : https://stackoverflow.com/questions/59774089/how-to-combine-duplicates-in-to-one-cell-per-column-in-r, Jan. 16, 2020, 2 Pages.

"International Search Report and Written Opinion Issued in PCT Application No. PCT/US21/034380", Mailed Date : Oct. 5, 2021, 11 Pages.

First Examination Report Received in Indian Patent Application No. 202347000657, mailed 1 on Aug. 4, 2025, 06 pages.

First Office Action Received for Chinese Application No. 202180059885.0, mailed on Dec. 17, 2025, 09 Pages. (English Translation Provided).

* cited by examiner

SEQUENCE OF TOKENS 300

THE CAT IN THE HAT.
0   1   2   3   4

400

| TOKENS 405 | The | Cat | In | Hat |
|---|---|---|---|---|
| POSITION VALUES 410 | 0,3 | 1 | 2 | 4 |

SEQUENCE OF TOKENS 500

SHE TOLD SAM SHE WILL GIVE HIM THE BOOK AND THE PEN AT THE GYM 0  1  2  3  4  5  6  7  8  9  10  11  12  13  14

| | She | Told | Sam | Will | Give | Him | The | Book | And | Pen | At | Gym |
|---|---|---|---|---|---|---|---|---|---|---|---|---|
| TOKENS 605 | She | Told | Sam | Will | Give | Him | The | Book | And | Pen | At | Gym |
| POSITION VALUES 610 | 0,3 | 1 | 2 | 4 | 5 | 6 | 7, 10, 13 | 8 | 9 | 11 | 12 | 14 |

*FIG. 6*

800

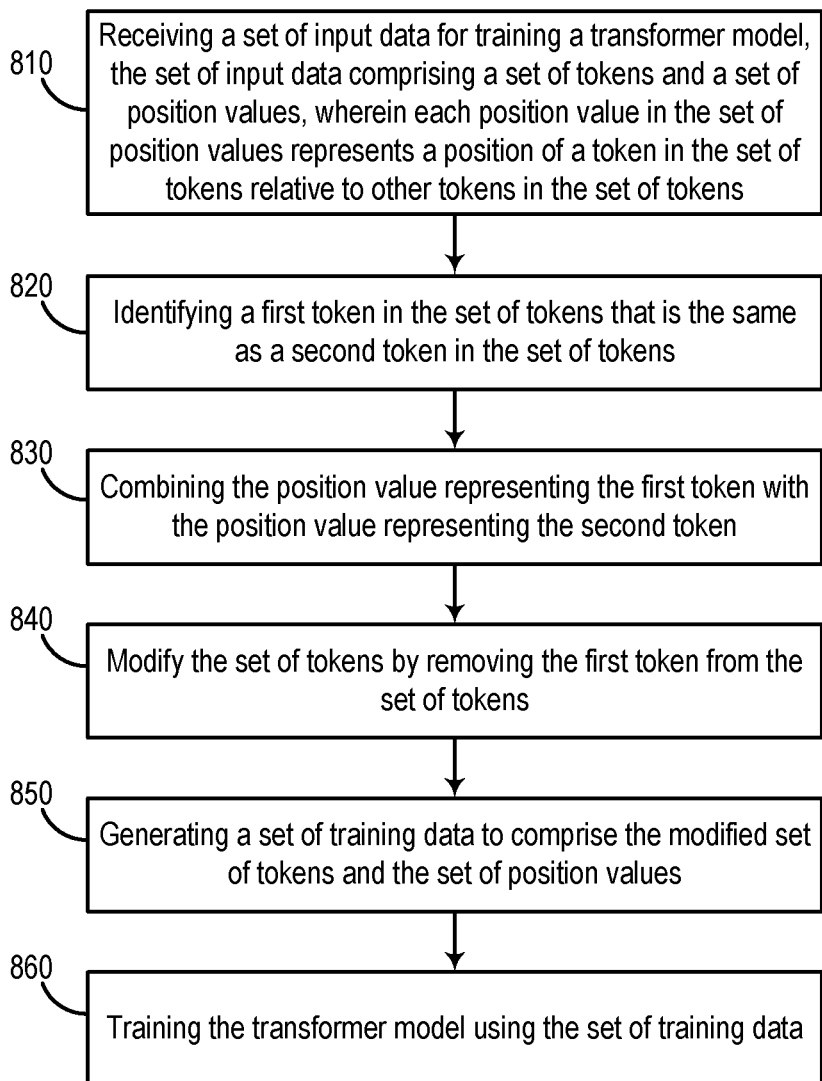

810  Receiving a set of input data for training a transformer model, the set of input data comprising a set of tokens and a set of position values, wherein each position value in the set of position values represents a position of a token in the set of tokens relative to other tokens in the set of tokens 820  Identifying a first token in the set of tokens that is the same as a second token in the set of tokens 830  Combining the position value representing the first token with the position value representing the second token 840  Modify the set of tokens by removing the first token from the set of tokens 850  Generating a set of training data to comprise the modified set of tokens and the set of position values 860  Training the transformer model using the set of training data

*FIG. 8*

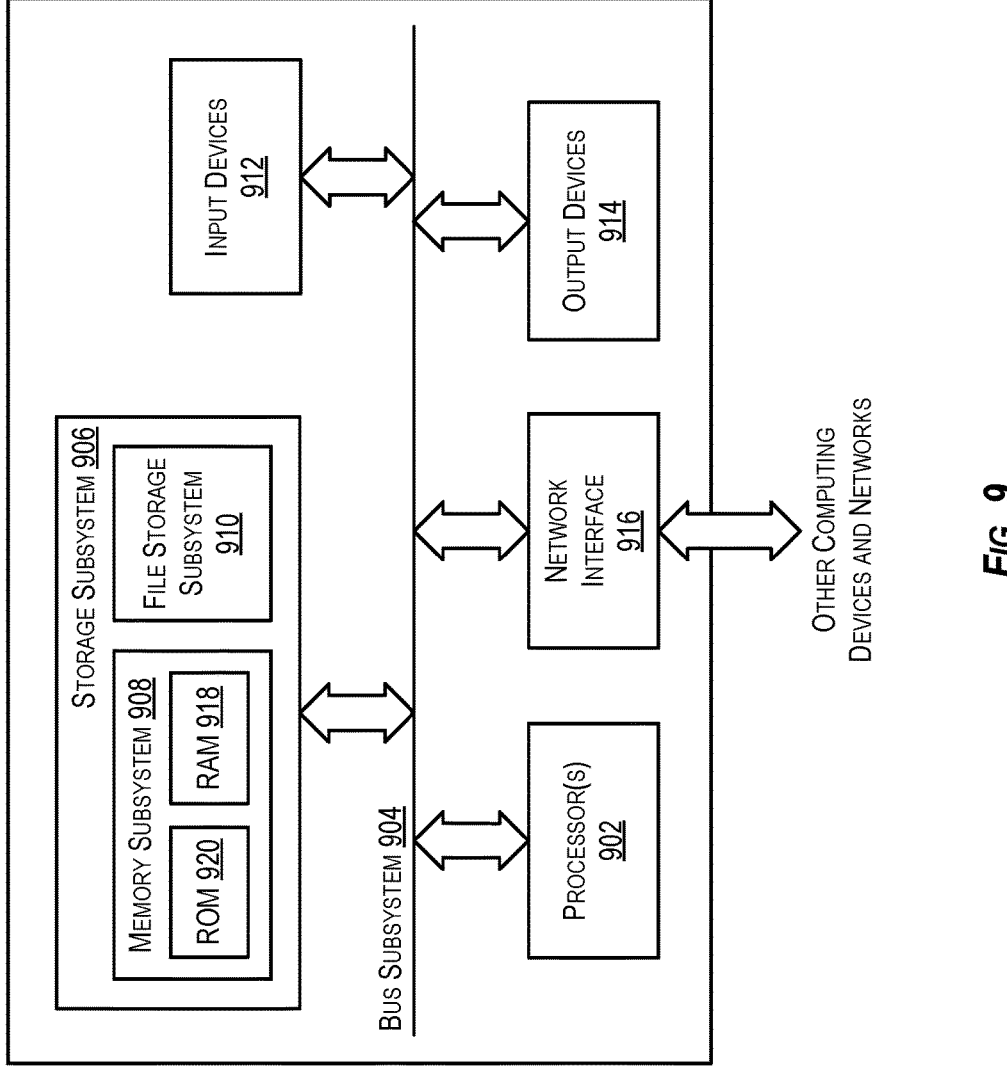
FIG. 9

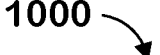
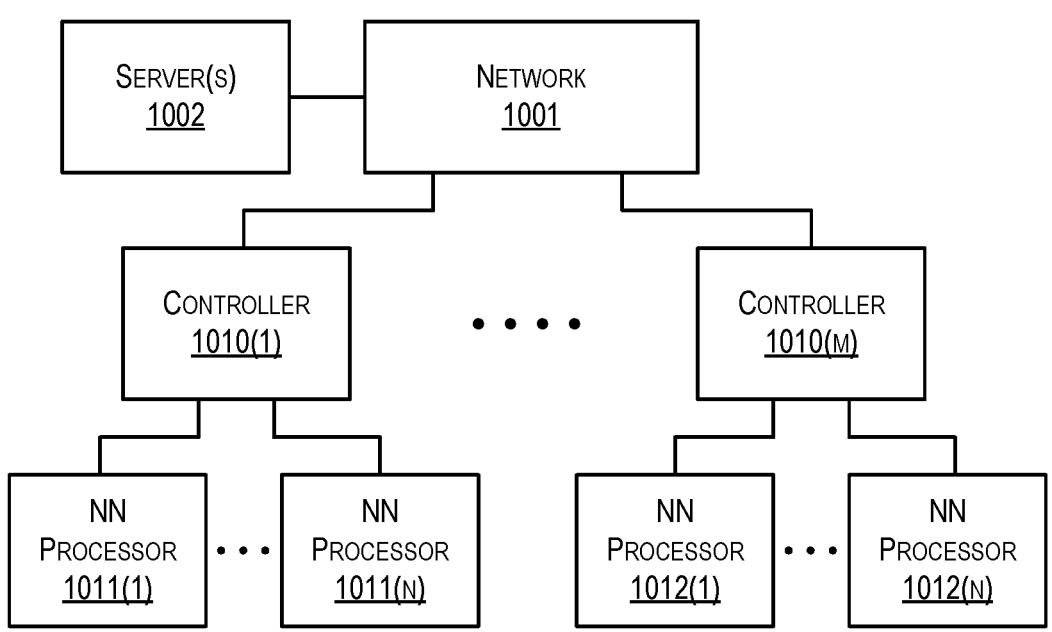
*FIG. 10*

COMPRESSING TOKENS BASED ON POSITIONS FOR TRANSFORMER MODELS

BACKGROUND

The present disclosure relates to a computing system. More particularly, the present disclosure relates to techniques for training a neural network.

Natural-language understanding (NLU) is a subfield of natural-language processing (NLP) in artificial intelligence that addresses comprehension by computers of the structure and meaning of human language. NLU enables voice technology, search engines, and machine translation to deduce what a user means, regardless of the way it is expressed A neural network is a machine learning model that underpins NLU applications. A neural network is trained for a particular purpose by running datasets through it, comparing results from the neural network to known results, and updating the network based on the differences.

BRIEF DESCRIPTION OF THE DRAWINGS

Various embodiments of the present disclosure are illustrated by way of example and not limitation in the figures of the accompanying drawings.

FIG. 5 illustrates another example sequence of tokens according to another embodiment.

FIG. 6 illustrates an example of training data with tokens compressed based on positions according to some embodiments.

FIG. 8 illustrates a process for determining position values of training data according to some embodiments.

FIG. 9 depicts a simplified block diagram of an example computer system according to some embodiments.

FIG. 10 illustrates a neural network processing system according to some embodiments.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for compressing tokens based on positions for training data that is used to train transformer models. In some embodiments, a system may receive input data for a transformer model. The input data can include a set of tokens (e.g., a set of words forming a sentence) and a set of position values. Each position value in the set of position values represents a position of a token in the set of tokens relative to other tokens in the set of tokens. The system may identify tokens in the set of tokens that are the same. For tokens that are the same, the system combines the position values of the same tokens with the position value of one of the same tokens. Next, the system modifies the set of tokens by removing the same tokens other than the one same token from the set of tokens. Then, the system generates a set of training data that includes the modified set of tokens and the set of position values. Finally, the set of training data is used to train a transformer model.

The techniques described in the present application provide a number of benefits and advantages over conventional methods of training a transformer model. For instance, compressing tokens based on positions reduces the sequence length of the training data. A transformer that can be trained using training data with shorter sequence lengths utilizes less hardware because the neural network of the transformer is smaller. Training a transformer that is allowed to support training data with shorter sequence lengths may utilizes less hardware because the neural network of such a transformer is smaller. In some instances, compressing tokens based on positions can simplify the solution space thereby allowing the transformer model to reach convergence faster.

Figure 1:
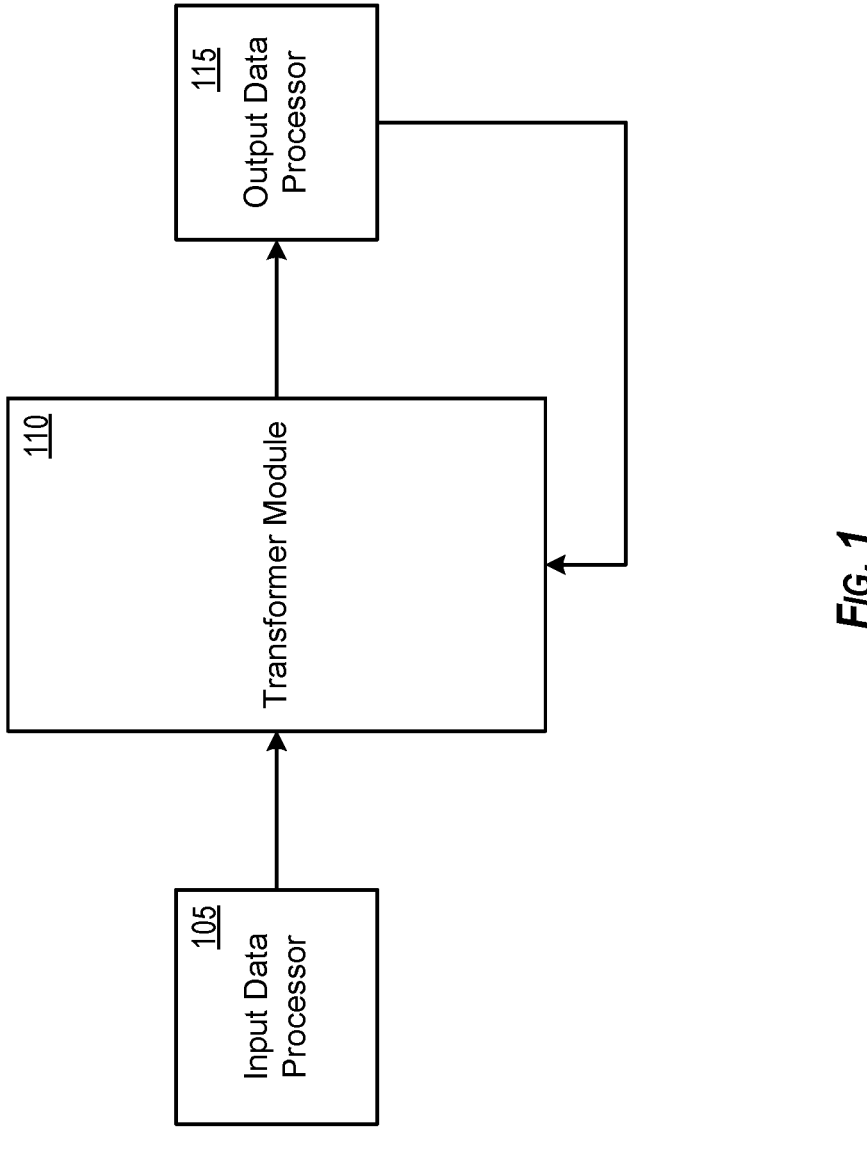
FIG. 1 illustrates a system for training a transformer model according to some embodiments.

FIG. 1 illustrates a system 100 for training a transformer model according to some embodiments. As shown, system 100 includes input data processor 105, transformer module 110, and output data processor 115. Input data processor 105 is configured to process input data used for training transformer module 110. For example, input data processor 105 may receive a set of input data that includes a sequence of tokens (e.g., a set of words) and a set of position values for the sequence of tokens. A position value may represent the relative position of a particular token in a sequence of tokens. In some cases, a set of input data can also include a set of sentence values. In some embodiments, a sentence value represents a sentence to which a token in the sequence of tokens belongs.

Based on the input data, input data processor 105 can compress tokens in the sequence of tokens. For example, input data processor 105 may identify groups of tokens in the sequence of tokens that are the same. For a particular group of same tokens, input data processor 105 can combine the position values of tokens in the group with the position value of one of the tokens in the group. Then, input data processor 105 may modify the sequence of tokens by removing the tokens in the group other than the one token from the sequence of tokens. Next, input data processor 105 can generate a set of training data that includes the modified sequence of tokens and the set of position values. Once the set of training data is generated, input data processor 105 can select a defined number of tokens in the modified sequence of tokens or a defined portion of the modified sequence of tokens (e.g., a percentage of the total number tokens in the sequence). In some embodiments, input data processor 105 selects tokens in the sequence randomly. Input data processor 105 then replaces the selected tokens with a defined token value. The selection and replacement of tokens may also referred to as token masking.

After masking tokens in the input data, input data processor 105 may determine token embeddings for each unmasked token in the sequence of tokens using an embedding space generated from a corpus of tokens (e.g., a vocabulary of words). In some embodiments, a token embedding space maps tokens in the corpus, which has many dimension, to numeric representations (e.g., vectors) having a lower number of dimensions. Then, input data processor 105 can determine position embeddings for each unmasked position value in the set of position values using an embedding space generated from a corpus of position values. The range of values in the corpus of position values can be a maximum sequence length (e.g., a maximum number of tokens in a sequence) that transformer module 110 is configured to process. For example, if transformer module 110 is configured to process sequence lengths of 1024, the range of values in the corpus of position values can be 0 to 1023. In some embodiments, a position value embedding space maps position values in the corpus, which has many dimension, to numeric representations (e.g., vectors) having a lower number of dimensions. For groups of same tokens where position values have been combined, input data processor 105 aggregates the position embeddings for these position values together to form an aggregate position embedding. In cases where the input data includes sentence values, input data processor 105 may determine sentence embeddings for each sentence value in the set of sentence values using an embedding space generated from a corpus of sentence values. In some embodiments, a sentence value embedding space maps sentence values in the corpus, which has many dimension, to numeric representations (e.g., vectors) having a lower number of dimensions. Upon determining embeddings for tokens and position values, and/or sentence values, input data processor 105 calculates an aggregate embedding for each token in the sequence of tokens by adding the token embedding, the corresponding position value embedding, and/or the corresponding sentence value embedding together. Finally, input data processor 105 sends the aggregate embeddings to transformer module 110 for training.

Transformer module 110 is responsible for predicting masked tokens given training data that includes unmasked tokens and masked tokens. In some embodiments, transformer module 110 is implemented by a transformer neural network (also referred to as a transformer or a transformer model). In some such embodiments, a transformer neural network has a sequence-to-sequence architecture. That is, the transformer neural network can transforms a given sequence of elements, such as the sequence of words in a sentence, into another sequence. In some embodiments, the transformer neural network includes weights used for predicting masked tokens and masked positions. The transformer neural network can adjust these weights based on feedback (e.g., differences between predicted tokens for masked tokens and actual values of masked tokens, etc.) received from output data processor 115 using a back propagation technique.

Transformer module 110 may determine relationships/correlations between tokens in input data. For instance, transformer module 110 can process tokens in relation to all the other tokens in a sequence, instead of one-by-one in order. In other words, transformer module 110 considers the full context of a token by looking at the tokens that come before and after it. Transformer module 110 may be used for machine translation and search (e.g., conversational queries). Other applications of transformer module 110 include: document summarization, document generation, named entity recognition (NER), speech recognition, and biological sequence analysis.

Output data processor 115 is configured to process data output from transformer module 110. For example, output data processor 115 can receive an array of data from transformer module 110 and label data. The array of data may include a numeric representation (e.g., the aggregate embedding described above) for each token in a sequence of tokens used as input to transformer module 110. The label data can include values of masked tokens in the training data. Next, output data processor 115 identifies the numeric representations of masked tokens in the array of data and determines the predicted tokens for the masked tokens. Output data processor 115 then determines the differences between the predicted tokens for masked tokens and the actual values of the masked tokens specified in the label data. Finally, output data processor 115 sends the calculated differences back to transformer module 110 to adjust the weights of transformer module 110.

Figure 2:
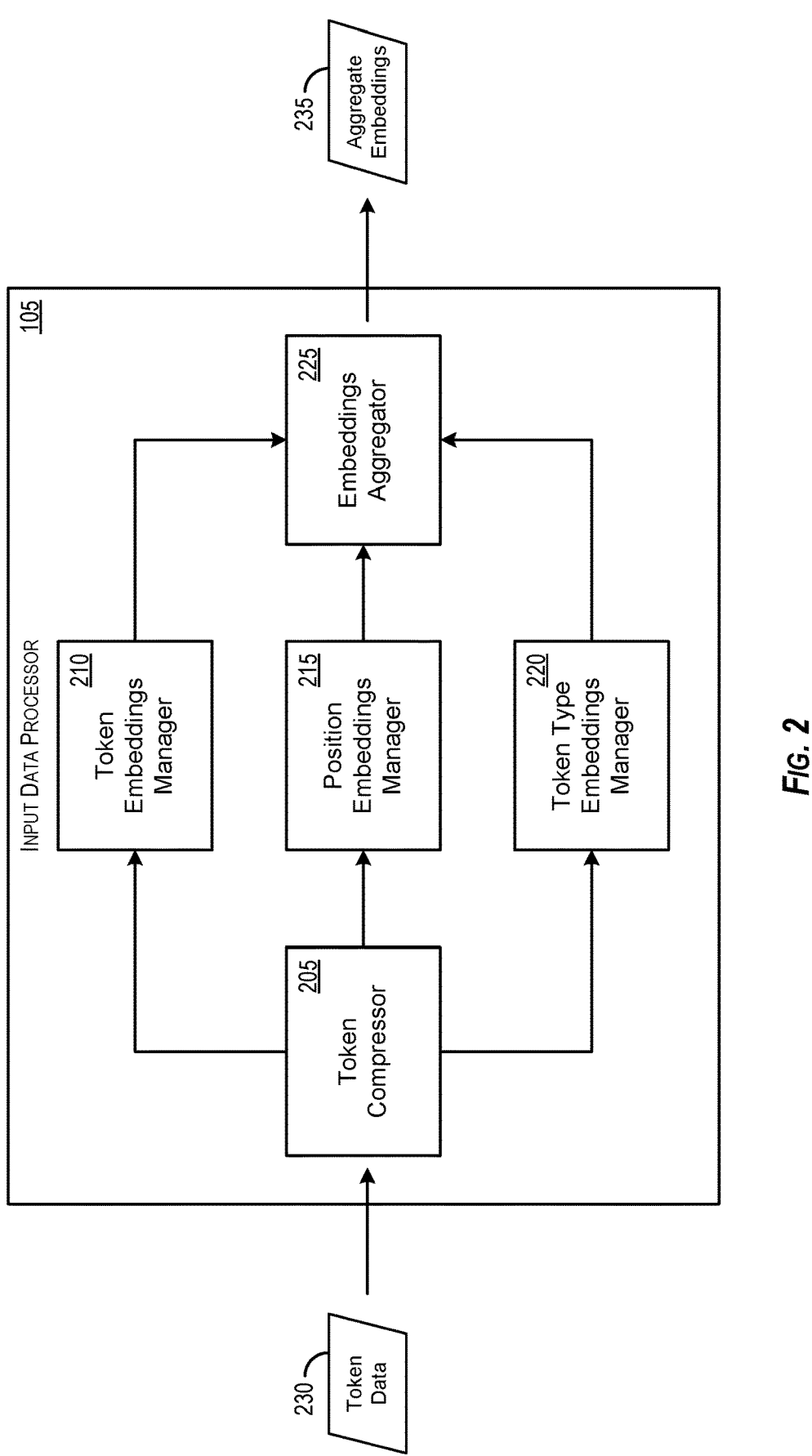
FIG. 2 illustrates an architecture of the input data processor illustrated in FIG. 1 according to some embodiments.

FIG. 2 illustrates an architecture of input data processor 105 according to some embodiments. As shown, input data processor 105 includes token compressor 205, token embeddings manager 210, position embeddings manager 215, token type embeddings manager 220, and embeddings aggregator 225. Token compressor 205 is configured to compress tokens and generate sets of training data. As illustrated in FIG. 2, token compressor 205 receives token data 230 as input data. For this example, token data 230 includes a sequence of tokens and a set of position values. To compress tokens in token data 230, token compressor 205 can identify groups of tokens in the sequence of tokens that are the same. For each identified group of tokens, token compressor 205 combines the position values of the tokens in the group with the position value of one of the tokens in the group. Next, token compressor 205 modifies the sequence of tokens by removing tokens in the group other than the one token from the sequence of tokens. Then, token compressor 205 generates a set of training data that includes the modified sequence of tokens and the set of position values.

Figures 3, 4:
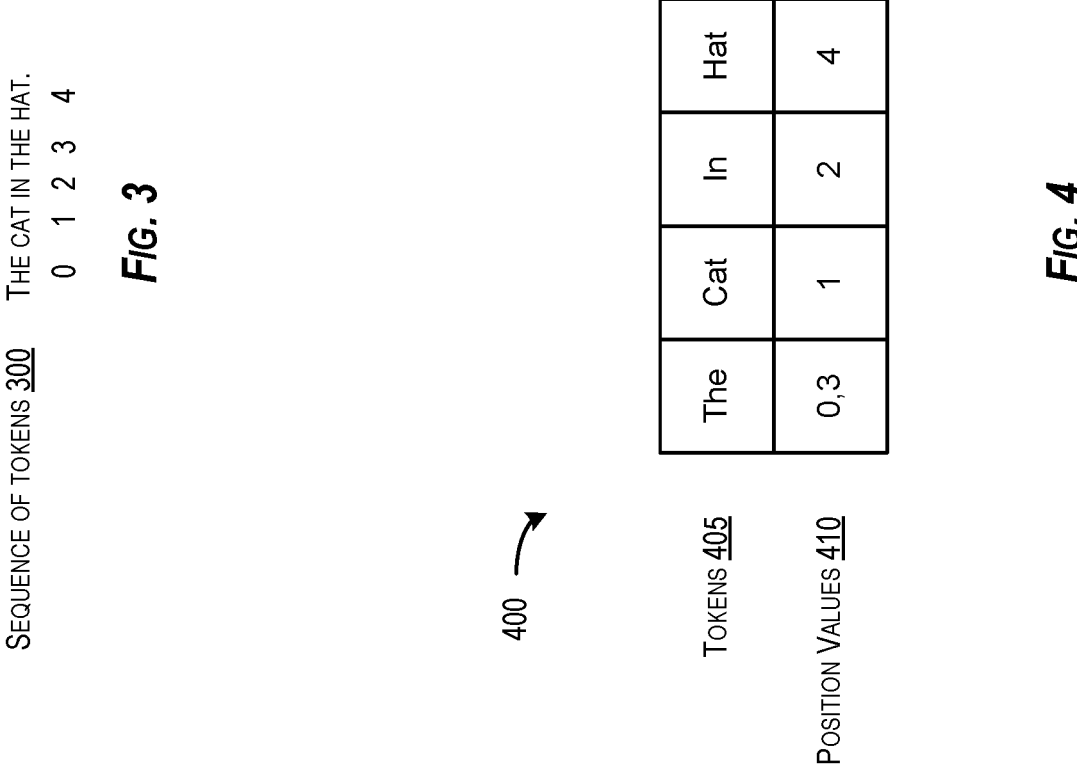
FIG. 3 illustrates an example sequence of tokens according to some embodiments.
FIG. 4 illustrates an example of training data with tokens compressed based on positions according to some embodiments.

FIG. 3 illustrates an example sequence of tokens 300 according to some embodiments. As shown, sequence of tokens 300 includes a set of words that form a sentence "The cat in the hat" and a set of position values. Sequence of tokens 300 and the set of position values can token data 230 that token compressor 205 receives. FIG. 4 illustrates an example of training data 400 with tokens compressed based on positions according to some embodiments. Specifically, training data 400 includes sequence of tokens 300 after tokens in sequence of tokens 300 have been compressed based on position values. To compress tokens in sequence of tokens 300, token compressor 205 identifies groups of tokens in sequence of tokens 300 that are the same. In this example, token compressor 205 identifies the first token "The" and the fourth token "the" a group of same tokens. Token compressor 205 then combines the position value of the fourth token in sequence of tokens 300 with the position value of the first token in sequence of tokens 300. Next, token compressor 205 modifies sequence of tokens 300 by removing the fourth token from sequence of tokens 300. Then, token compressor 205 generates training data 400 that includes the modified sequence of tokens 300 and the set of position values. As shown in FIG. 4, the fourth token "the" has been removed from sequence of tokens 300. In addition, the position value of the fourth token (3 in this example) has been combined with the position value of the first token (0 in this example).

FIG. 5 illustrates another example sequence of tokens 500 according to another embodiment. As depicted in FIG. 5, sequence of tokens 500 includes a set of words that form a sentence "She told Sam she will give him the book and the pen at the gym" and a set of position values. Sequence of tokens 500 and the set of position values can token data 230 that token compressor 205 receives. FIG. 6 illustrates an example of training data 600 with tokens compressed based on positions according to some embodiments. In particular, training data 600 includes sequence of tokens 500 after tokens in sequence of tokens 500 have been compressed based on position values. Token compressor 205 compresses tokens in sequence of tokens 500 by identifying groups of tokens in sequence of tokens 500 that are the same. For this example, token compressor 205 identifies a first group of same tokens that includes the first token "She" and the fourth token "she." Token compressor 205 also identifies a second group of same tokens that includes the eighth token "the," the eleventh token "the," and the fourteenth token "the." For the first group of same tokens, token compressor 205 combines the position value of the fourth token in sequence of tokens 500 with the position value of the first token in sequence of tokens 500. For the second group of same tokens, token compressor 205 combines the position values of the eleventh and fourteenth tokens in sequence of tokens 500 with the position value of the eighth token in sequence of tokens 500. Next, token compressor 205 modifies sequence of tokens 500 by removing the fourth token, the eleventh token, and the fourteenth token from sequence of tokens 500. Token compressor 205 then generates training data 600 that includes the modified sequence of tokens 500 and the set of position values. As illustrated in FIG. 6, the fourth token, the eleventh token, and the fourteenth token have been removed from sequence of tokens 500. Also, the position value of the fourth token (3 in this example) has been combined with the position value of the first token (0 in this example) and the position values of the eleventh and fourteenth tokens (10 and 13 in this example) have been combined with the position value of the eighth token (7 in this example).

Returning to FIG. 2, after token compressor 205 generates a set of training data, token compressor 205 may select tokens in sets of training data and mask them. In some embodiments, token compressor 205 selects tokens to be masked randomly. Next, token compressor 205 sends the tokens in the training data to token embeddings manager 210, the position values in the training data to position embeddings manager 215, and the sentence values to token type embeddings manager 220.

Token embeddings manager 210 is responsible for determining token embeddings for tokens. For example, upon receiving training data from token compressor 205, token embeddings manager 210 converts each token in the training data to a numeric representation using an embedding space generated from a corpus of tokens. The numeric representation of a token can be a vector of 128, 256, 1024, 2048, 4096, etc. floating-point numbers. In some embodiments, the token embedding space is implemented as a table with entries that map tokens to their corresponding numeric representations. To determine the numeric representation of a particular token in some such embodiments, token embeddings manager 210 performs a look up on the table to find an entry that matches the token and converts the token to the numeric representation specified by the entry. Once token embeddings manager 210 determines numeric representations for each token in the training data, token embeddings manager 210 sends them to embeddings aggregator 225.

Position embeddings manager 215 is configured to determining position embeddings for position values. For instance, when position embeddings manager 215 receives training data from token compressor 205, position embeddings manager 215 converts each position value in the training data to a numeric representation using an embedding space generated from a corpus of position values. The numeric representation of a position value may be a vector of 128, 256, 1024, 2048, 4096, etc. floating-point numbers. In some embodiments, the position value embedding space is implemented as a table with entries that map position values to their corresponding numeric representations. To determine the numeric representation of a particular position value in some such embodiments, position embeddings manager 215 performs a look up on the table to find an entry that matches the position value and converts the position value to the numeric representation specified by the entry. After determining numeric representations for each position value in the training data, position embeddings manager 215 sends them to embeddings aggregator 225.

For groups of same tokens where position values have been combined, position embeddings manager 215 aggregates the position embeddings for the position values together to form an aggregate position embedding. Referring to FIG. 4 as an example, position embeddings manager 215 would aggregate the position embedding for position value 0 and the position embedding for position 3 together to form an aggregate position embedding for the first token "The" in training data 400. Referring to FIG. 6 as another example, position embeddings manager 215 would aggregate the position embedding for position value 0 and the position embedding for position 3 together to form an aggregate position embedding for the first token "She" in training data 600. In addition, position embeddings manager 215 would aggregate the position embedding for position value 7, the position embedding for position value 10, and the position embedding for position value together to form an aggregate position embedding for the seventh token "the" in training data 600.

Token type embeddings manager 220 handles the determination of sentence embeddings for sentence values. For example, once token type embeddings manager 220 receives training data from token compressor 205, token type embeddings manager 220 converts each sentence value in the training data to a numeric representation using an embedding space generated from a corpus of sentence values. The numeric representation of a sentence value can be a vector of 128, 256, 1024, 2048, 4096, etc. floating-point numbers. In some embodiments, the sentence value embedding space is implemented as a table with entries that map sentence values to their corresponding numeric representations. To determine the numeric representation of a particular sentence value in some such embodiments, token type embeddings manager 220 performs a look up on the table to find an entry that matches the sentence value and converts the sentence value to the numeric representation specified by the entry. Once token type embeddings manager 220 determines numeric representations for each sentence value in the training data, token type embeddings manager 220 sends them to embeddings aggregator 225.

Embeddings aggregator 225 is configured to calculate aggregate embeddings. For example, embeddings aggregator 225 may receive token embeddings from token embeddings manager 210, position embeddings from position embeddings manager 215, and sentence embeddings from token type embeddings manager 220. Upon receiving the data from each of these components, embeddings aggregator 225 calculates an aggregate embedding for each token in the training data by adding the token embedding of the token, the position embedding associated with the token, and the sentence embedding associated with the token. Thus, the aggregate embedding for a token is a single numeric representation for the token, the position value associated with the token, and the sentence value associated with the token. Finally, embeddings aggregator 225 outputs the calculated aggregate embeddings as aggregate embeddings 235. In some embodiments, aggregate embeddings 235 is implemented in the form of an S×H array of vectors (e.g. a matrix). As such, the array may represent the sequence of tokens in token data 230 where the tokens are encoded representations of words, position values, and sentence values. For an S×H array, S can be the length (e.g., the total number of tokens) in a sequence of tokens and H can be the total number of numeric values in a vector used to represent a token. For example, if a token is represented using a vector of 1024 floating-point numbers, H is 1024.

Figure 7:
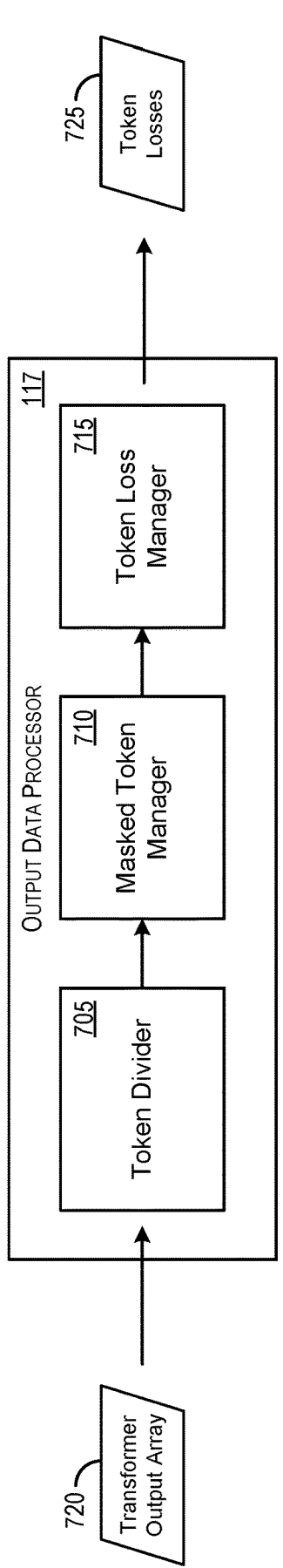
FIG. 7 illustrates an architecture of the output data processor illustrated in FIG. 1 according to some embodiments.

FIG. 7 illustrates an architecture of output data processor 115 according to some embodiments. As shown, output data processor 115 includes token divider 705, masked token manager 710, and token loss manager 715. Token divider 705 is responsible for dividing data based on masked tokens. As shown in FIG. 7, token divider 705 receives transformer output array 720 as input. In some embodiments, transformer output array 720 is implemented in the form of an S×H array of vectors (e.g. a matrix) similar to the S×H array used to implement aggregate embeddings 235 described above. Token divider 705 identifies the vector representations of the masked tokens in transformer out array 720 and sends them to masked token manager 710. In some embodiments where transformer output array 720 is implemented in the form of an S×H array, if T is the number of masked tokens, then token divider 705 sends masked token manager 710 a T×H array.

Masked token manager 710 is configured to predict token for masked tokens. For instance, masked token manager 710 can receive from token divider 705 vector representations of masked tokens. Next, masked token manager 710 performs a set of projection functions on the vector representations to determine probabilities associated with corpus of tokens (e.g., a vocabulary of words) for each masked token. For each masked token, masked token manager 710 selects the token having the highest probability as being the token predicted for the masked token. In some embodiments where the vector representations for the masked tokens are implemented in the form of a T×H array, the set of projection functions include multiplying the T×H array by an H×V array to produce a T×V array. For the H×V array, V may be the size of a corpus of tokens and H can be the total number of numeric values in a vector used to represent each token in the corpus. The T×V array includes a vector of V values for each masked token. Each value in the vector represents a probability that a corresponding token in the corpus is the masked token. After predicting tokens for masked tokens, masked token manager 710 sends the predicted tokens to token loss manager 715.

Token loss manager 715 is responsible for determining token losses. For instance, when token loss manager 715 receives predicted tokens for masked tokens from masked token manager 710, token loss manager 715 calculates differences (e.g., errors) between the predicted tokens and the actual values of the masked tokens (e.g., stored in label data). The calculated differences is depicted in FIG. 7 as token losses 725. Token loss manager 715 may send token losses 725 to transformer module 110, which transformer module 110 uses to adjust its weights.

FIG. 8 illustrates a process 800 for determining position values of training data according to some embodiments. In some embodiments, system 100 performs process 800. Process 800 begins by receiving, at 810, a set of input data for training a transformer model. The set of input data comprises a set of tokens and a set of position values. Each position value in the set of position values represents a position of a token in the set of tokens relative to other tokens in the set of tokens. Referring to FIG. 2 as an example, input data processor 105 may receive the token data 230 as the set of input data for training transformer module 110. The input data can include a sequence of tokens and a set of position values like the data illustrated in FIGS. 3 and 5.

Next, process 800 identifies, at 820, a first token in the set of tokens that is the same as a second token in the set of tokens. Referring to FIG. 3 as an example, token compressor 205 can identify the first token "The" and the fourth token "the" as same tokens in sequence of tokens 300. Process 800 then combines, at 830, the position value representing the first token with the position value representing the second token. Referring to FIG. 4 as an example, token compressor 205 may combine the position value (3 in this example) representing the fourth token with the position value (0 in this example) representing the first token.

At 840, process 800 modifies the set of tokens by removing the first token from the set of tokens. Referring to FIGS. 3 and 4 as an example, token compressor 205 may remove the fourth token "the' from sequence of tokens 300. Next, process 800 generates, at 850, a set of training data to comprise the modified set of tokens and the set of position values. Referring to FIG. 4 as an example, token compressor 205 can generate training data 400. As shown, training data 400 includes the modified sequence of tokens 300 (i.e., without the fourth "the" token in sequence of tokens 300) and the set of position values shown in FIG. 3.

Finally, process 800 trains, at 860, the transformer model using the set of training data. Referring to FIG. 2 as an example, token compressor 205 may send the respective portions of the training data to token embeddings manager 210, position embeddings manager 215, and token type embeddings manager 220 for processing. For groups of same tokens where position values have been combined, position embeddings manager 215 aggregates the position embeddings for the position values together to form an aggregate position embedding. Referring to FIG. 4 as an example, position embeddings manager 215 would aggregate the position embedding for position value 0 and the position embedding for position 3 together to form an aggregate position embedding for the first token "The" in training data 400. Once embeddings aggregator 225 receives the embeddings from token embeddings manager 210, position embeddings manager 215, and token type embeddings manager 220, embeddings aggregator 225 aggregates the embeddings to produce aggregate embeddings 235, which is then used to train transformer module 110.

The techniques describe above may be implemented in a wide range of computer systems configured to process neural networks. FIG. 9 depicts a simplified block diagram of an example computer system 900, which can be used to implement the techniques described in the foregoing disclosure. In some embodiments, computer system 900 may be used to implement system 100. As shown in FIG. 9, computer system 900 includes one or more processors 902 that communicate with a number of peripheral devices via a bus subsystem 904. These peripheral devices may include a storage subsystem 906 (e.g., comprising a memory subsystem 908 and a file storage subsystem 910) and a network interface subsystem 916. Some computer systems may further include user interface input devices 912 and/or user interface output devices 914.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computer systems or networks. Embodiments of network interface subsystem 916 can include, e.g., Ethernet, a Wi-Fi and/or cellular adapter, a modem (telephone, satellite, cable, ISDN, etc.), digital subscriber line (DSL) units, and/or the like.

Storage subsystem 906 includes a memory subsystem 908 and a file/disk storage subsystem 910. Subsystems 908 and 910 as well as other memories described herein are examples of non-transitory computer-readable storage media that can store executable program code and/or data that provide the functionality of embodiments of the present disclosure.

Memory subsystem 908 includes a number of memories including a main random access memory (RAM) 918 for storage of instructions and data during program execution and a read-only memory (ROM) 920 in which fixed instructions are stored. File storage subsystem 910 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than system 900 are possible.

FIG. 10 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 1002, which may comprise architectures illustrated in FIG. 9 above, may be coupled to a plurality of controllers 1010(1)-1010(M) over a communication network 1001 (e.g. switches, routers, etc.). Controllers 1010(1)-1010(M) may also comprise architectures illustrated in FIG. 9 above. Each controller 1010(1)-1010(M) may be coupled to one or more NN processors, such as processors 1011(1)-1011(N) and 1012(1)-1012(N), for example. NN processors 1011(1)-1011(N) and 1012(1)-1012(N) may include a variety of configurations of functional processing blocks and memory optimized for neural network processing, such as training or inference. The NN processors are optimized for neural network computations. Server 1002 may configure controllers 1010 with NN models as well as input data to the models, which may be loaded and executed by NN processors 1011(1)-1011(N) and 1012(1)-1012(N) in parallel, for example. Models may include layers and associated weights as described above, for example. NN processors may load the models and apply the inputs to produce output results. NN processors may also implement training algorithms described herein, for example.

Further Example Embodiments

In various embodiments, the present disclosure includes systems, methods, and apparatuses for determining position values for training data that is used to train transformer models. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a system comprising a set of processing units and a non-transitory machine-readable medium storing instructions that when executed by at least one processing unit in the set of processing units cause the at least one processing unit to receive a set of input data for training a transformer model, the set of input data comprising a set of tokens and a set of position values, wherein each position value in the set of position values represents a position of a token in the set of tokens relative to other tokens in the set of tokens; identify a first token in the set of tokens that is the same as a second token in the set of tokens; combine the position value representing the first token with the position value representing the second token; modify the set of tokens by removing the first token from the set of tokens; generate a set of training data to comprise the modified set of tokens and the set of position values; and train the transformer model using the set of training data.

In one embodiment, generating the set of training data comprises determining a first position embedding for the position value representing the first token; determining a second position embedding for the position value representing the second token; and aggregating the first position embedding and the second position embedding to form a third position embedding.

In one embodiment, generating the set of training data further comprises determining a token embedding for the second token; and aggregating the token embedding and the third position embedding to form an aggregate embedding for the second token.

In one embodiment, the present disclosure identifies a third token in the set of tokens that is the same as the first and second tokens in the set of tokens and combines the position value representing the third token with the position values representing the first and second tokens. Modifying the set of tokens is by further removing the third token from the set of tokens.

In one embodiment, generating the set of training data comprises determining a first position embedding for the position value representing the first token; determining a second position embedding for the position value representing the second token; determining a third position embedding for the position value representing the third token; and

11

12 aggregating the first position embedding, the second position embedding, and the third position embedding to form a fourth position embedding.

In one embodiment, generating the set of training data further comprises determining a token embedding for the second token; and aggregating the token embedding and the fourth position embedding to form an aggregate embedding for the second token.

In one embodiment, the present disclosure identifies a third token in the set of tokens that is the same as a fourth token in the set of tokens and combines the position value representing the third token with the position value representing the fourth token. Modifying the set of tokens is further by removing the third token from the set of tokens.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system comprising:

a set of processing units; and a non-transitory machine-readable medium storing instructions that when executed by at least one processing unit in the set of processing units cause the at least one processing unit to:

receive a set of input data for training a transformer model, the set of input data comprising a set of tokens and a set of position values, wherein each position value in the set of position values represents a position of a token in the set of tokens relative to other tokens in the set of tokens;

identify a first token in the set of tokens that is the same as a second token in the set of tokens;

compress the set of tokens by combining the position value representing the first token with the position value representing the second token;

modify the set of compressed tokens by removing the first token from the set of tokens;

generate a set of training data based on the modified set of tokens and the set of position values; and train the transformer model using the set of training data, wherein training the transformer model comprises:

masking a set of selected tokens by replacing the selected tokens with a defined token value to generate masked tokens;

generating predicted tokens for masked tokens;

generating feedback based on differences between predicted tokens for masked tokens and actual values of masked tokens; and adjusting weights of the transformer model based on the feedback.

2. The system of claim 1, wherein generating the set of training data comprises:

determining a first position embedding for the position value representing the first token;

determining a second position embedding for the position value representing the second token; and aggregating the first position embedding and the second position embedding to form a third position embedding.

3. The system of claim 2, wherein generating the set of training data further comprises:

determining a token embedding for the second token; and aggregating the token embedding and the third position embedding to form an aggregate embedding for the second token.

4. The system of claim 1, wherein the instructions further cause the at least one processing unit to:

identify a third token in the set of tokens that is the same as the first and second tokens in the set of tokens; and combine the position value representing the third token with the position values representing the first and second tokens, wherein modifying the set of tokens is by further removing the third token from the set of tokens.

5. The system of claim 4, wherein generating the set of training data comprises:

determining a first position embedding for the position value representing the first token;

determining a second position embedding for the position value representing the second token;

determining a third position embedding for the position value representing the third token; and aggregating the first position embedding, the second position embedding, and the third position embedding to form a fourth position embedding.

6. The system of claim 5, wherein generating the set of training data further comprises:

determining a token embedding for the second token; and aggregating the token embedding and the fourth position embedding to form an aggregate embedding for the second token.

7. The system of claim 1, wherein the instructions further cause the at least one processing unit to:

identify a third token in the set of tokens that is the same as a fourth token in the set of tokens; and combine the position value representing the third token with the position value representing the fourth token, wherein modifying the set of tokens is further by removing the third token from the set of tokens.

8. A method comprising:

receiving a set of input data for training a transformer model, the set of input data comprising a set of tokens and a set of position values, wherein each position value in the set of position values represents a position of a token in the set of tokens relative to other tokens in the set of tokens;

identifying a first token in the set of tokens that is the same as a second token in the set of tokens;

compressing the set of tokens by combining the position value representing the first token with the position value representing the second token;

modifying the set of tokens by removing the first token from the set of tokens;

generating a set of training data to comprise the modified set of tokens and the set of position values; and training the transformer model using the set of training data, wherein training the transformer model comprises:

masking a set of selected tokens by replacing the selected tokens with a defined token value to generate masked tokens;

generating predicted tokens for masked tokens;

generating feedback based on differences between predicted tokens for masked tokens and actual values of masked tokens; and adjusting weights of the transformer model based on the feedback.

9. The method of claim 8, wherein generating the set of training data comprises:

determining a first position embedding for the position value representing the first token;

determining a second position embedding for the position value representing the second token; and aggregating the first position embedding and the second position embedding to form a third position embedding.

10. The method of claim 9, wherein generating the set of training data further comprises:

determining a token embedding for the second token; and aggregating the token embedding and the third position embedding to form an aggregate embedding for the second token.

11. The method of claim 8 further comprising:

identifying a third token in the set of tokens that is the same as the first and second tokens in the set of tokens; and combining the position value representing the third token with the position values representing the first and second tokens, wherein modifying the set of tokens is by further removing the third token from the set of tokens.

12. The method of claim 11, wherein generating the set of training data comprises:

determining a first position embedding for the position value representing the first token;

determining a second position embedding for the position value representing the second token;

determining a third position embedding for the position value representing the third token; and aggregating the first position embedding, the second position embedding, and the third position embedding to form a fourth position embedding.

13. The method of claim 12, wherein generating the set of training data further comprises:

determining a token embedding for the second token; and aggregating the token embedding and the fourth position embedding to form an aggregate embedding for the second token.

14. The method of claim 8 further comprising:

identifying a third token in the set of tokens that is the same as a fourth token in the set of tokens; and combining the position value representing the third token with the position value representing the fourth token, wherein modifying the set of tokens is further by removing the third token from the set of tokens.

15. A non-transitory machine-readable medium storing a program executable by at least one processing unit of a computer system, the program comprising sets of instructions for:

receiving a set of input data for training a transformer model, the set of input data comprising a set of tokens and a set of position values, wherein each position value in the set of position values represents a position of a token in the set of tokens relative to other tokens in the set of tokens;

identifying a first token in the set of tokens that is the same as a second token in the set of tokens;

compressing the set of tokens by combining the position value representing the first token with the position value representing the second token;

modifying the set of tokens by removing the first token from the set of tokens;

generating a set of training data to comprise the modified set of tokens and the set of position values;

generating token embeddings, position embeddings, and token type embedding based on the training data;

generating aggregate embeddings based on the token embeddings, the position embeddings, and the token type embedding; and training the transformer model using the aggregate embeddings set of training data, wherein training the transformer model comprises:

masking a set of selected tokens by replacing the selected tokens with a defined token value to generate masked tokens;

generating predicted tokens for masked tokens;

generating feedback based on differences between predicted tokens for masked tokens and actual values of masked tokens; and adjusting weights of the transformer model based on the feedback.

16. The non-transitory machine-readable medium of claim 15 wherein generating the set of training data comprises:

determining a first position embedding for the position value representing the first token;

determining a second position embedding for the position value representing the second token; and aggregating the first position embedding and the second position embedding to form a third position embedding.

17. The non-transitory machine-readable medium of claim 16, wherein generating the set of training data further comprises:

determining a token embedding for the second token; and aggregating the token embedding and the third position embedding to form an aggregate embedding for the second token.

18. The non-transitory machine-readable medium of claim 15, wherein the program further comprises sets of instructions for:

identifying a third token in the set of tokens that is the same as the first and second tokens in the set of tokens; and combining the position value representing the third token with the position values representing the first and second tokens, wherein modifying the set of tokens is by further removing the third token from the set of tokens.

19. The non-transitory machine-readable medium of claim 18, wherein generating the set of training data comprises:

determining a first position embedding for the position value representing the first token;

determining a second position embedding for the position value representing the second token;

determining a third position embedding for the position value representing the third token; and aggregating the first position embedding, the second position embedding, and the third position embedding to form a fourth position embedding.

20. The non-transitory machine-readable medium of claim 19, wherein generating the set of training data further comprises:

determining a token embedding for the second token; and aggregating the token embedding and the fourth position embedding to form an aggregate embedding for the second token.

* * * * *